June 14, 1966  I. H. S. FRASER  3,256,431
ANALYZING APPARATUS
Filed Dec. 20, 1962
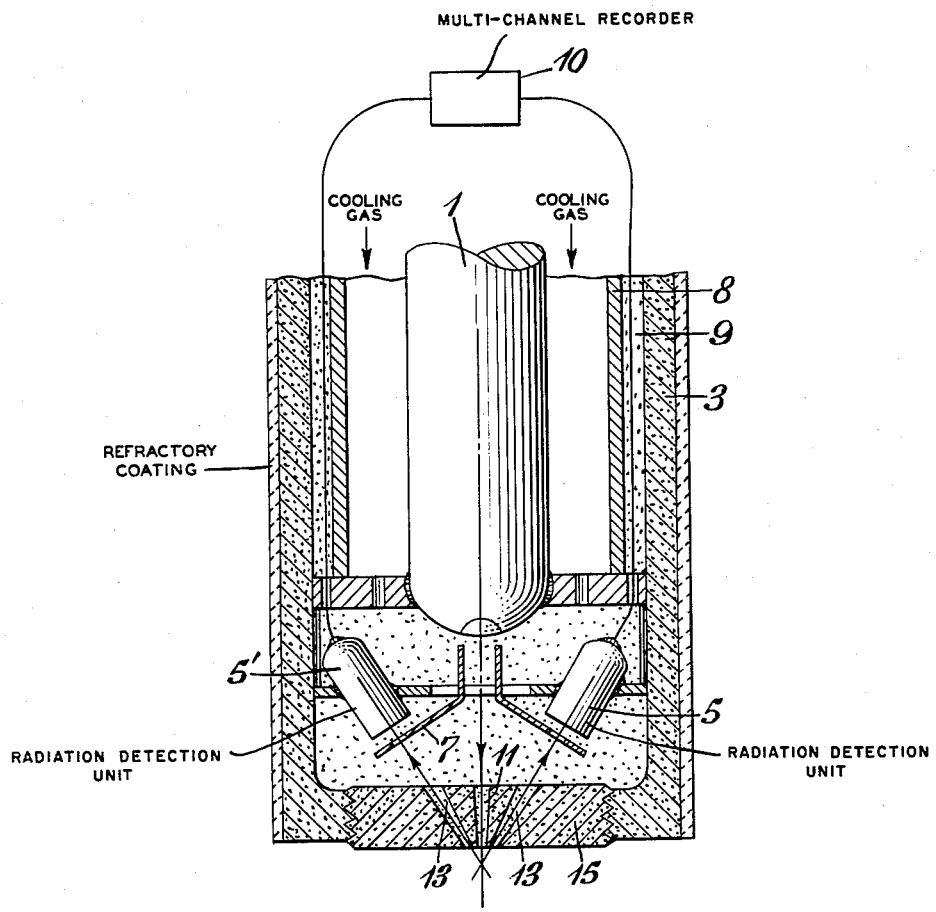
INVENTOR.
IAN H. S. FRASER
BY
ATTORNEY

United States Patent Office 3,256,431
Patented June 14, 1966

3,256,431
ANALYZING APPARATUS
Ian H. S. Fraser, Lewiston, N.Y., assignor to Union
Carbide Corporation, a corporation of New York
Filed Dec. 20, 1962, Ser. No. 246,185
4 Claims. (Cl. 250—43.5)

The present invention relates to the analysis of molten materials. More particularly, the present invention relates to an apparatus for making a rapid analysis of molten materials by means of X-ray fluorescence techniques.

In modern manufacturing practice, as is well known, rapid and close quality control is extremely important from an economic point of view, especially when dealing with the production of metals in large quantities. Although wet methods of chemical analysis are available, such methods can take as long as one hour or more to perform and in many instances this is too long to be of any considerable benefit. With the use of spectroscopy, it is possible to obtain an analysis of a heat of molten metal in a much shorter time. With this technique, as presently practiced, a sample of molten metal is obtained from the furnace, cooled, shaped, and analyzed by a direct reading spectrograph. In this way a highly reliable compositional analysis can often be obtained in about three minutes. However, in many instances even this relatively short delay is highly undesirable.

It is therefore an object of the present invention to provide a method and apparatus for the instantaneous and direct analysis of molten material.

Other objects will be apparent from the following description and claims taken in conjunction with the drawing in which FIGURE 1 shows an elevational view partly in section of an apparatus in accordance with the present invention.

With reference to the drawing, a source of primary X-ray radiation 1, which can for example be a Machlett or similar X-ray tube, is arranged within a hollow body member or probe 3 which is formed of dense carbon or graphite.

A plurality of radiation detection units indicated as 5 and 5' are also located in probe 3 and are shielded from the primary X-ray radiation source 1 by collimator 7 which can be formed of nickel or other suitable material. Although only two detection units are illustrated in the drawing, any practical number can be included in the probe to provide the operation more fully described hereinbelow. The source of X-ray radiation and detection units are conveniently mounted on support member 8.

The separate detection units are each designed to receive different wave lengths of fluorescent radiation and to transmit signals having a predetermined relationship to the intensity of received fluorescent radiation. For purposes of the present invention, the detection units can be commercially available apparatus which are adapted to receive different particular wave lengths of fluorescent radiation. For example, proportional detectors of the type manufactured by Philips Electronics (Norelco) used in conjunction with conventional pulse height analyzers are suitable.

The received radiation is converted by the respective detection units into electrical signals having a predetermined relationship to the intensity of the received radiation. For example, the developed electrical signals can be directly proportional to the intensity of the received radiation.

In the practice of the present invention, probe 3, containing the primary X-ray source and the detection units, is placed in contact with a melt of the material to be analyzed. In analyzing steel, for example, the probe is lowered into the furnace containing the melt so that the bottom of the probe is in contact with the molten steel.

It has been discovered that the bottom of the probe is not attacked by the molten steel although the sides of the probe are attacked to some extent by oxidation and slag. However, a refractory coating such as clay bonded alumina cement, e.g. Alundum,[1] prevents this effect.

When the probe has been placed in position, radiation in the form of X-rays emitted by source 1 is directed downward through the bottom of the probe into the molten metal. The material, preferably graphite, which is used as the bottom of the probe is transparent to X-ray radiation to a considerable extent and consequently the X-ray irradiated metal fluoresces, with each element in the melt emitting rays having a characteristic wave length and an intensity proportional to the amount of the element in the melt.

The secondary fluorescent rays developed in the aforesaid manner are transmitted through the bottom of the probe and to the detection units via the collimating means. By the use of filters, pulse height analyzers, or other known techniques, the respective detection units are made responsive to only a particular wave length of radiation corresponding to a particular element in the melt.

Electrical signals are developed in the respective detection units by the received radiation and these signals are transmitted by way of conductors 9 to a device 10 outside the probe which provides an indication of the magnitude of the separate transmitted signals. An example of a device suitable for this purpose is a multichannel recorder equipped with a pulse amplifier and pulse height analyzer.

If sufficient detection units are provided to receive fluorescent radiation corresponding to each element in the melt, then at times, the composition of the melt can be determined directly by comparing the intensities of the received signals. If fewer detection units are provided than the number necessary to receive fluorescent radiation from all the elements in the melt, then indirect methods are required to determine the amount of the measured elements.

This can be accomplished through calibration techniques such as by obtaining measurements with an apparatus of the present invention from accurately known compositions and then using the measured values obtained as a standard with which further readings obtained from unknown compositions are compared. This type of technique can also be applied when using only one detection unit in the probe to analyze the melt for only one element.

In the apparatus of the present invention, the hollow body member or probe is formed of carbon or graphite since such materials can withstand repeated contacts with molten metals without serious attack. Graphite in particular has been found to be highly resistant to attack when in contact with molten steel.

Carbon or graphite is also used since these materials are transparent to a considerable extent to X-ray and fluorescent radiation. However, to improve the sensitivity of the apparatus of the present invention, the probe can be provided with a plurality of bores which extend part way through the bottom member. As indicated in the drawing, bore 11 extends downward from directly below the X-ray source 1 while bores 13 extend in line with the collimating means and the detection units. In this way, a greater amount of radiation is transmitted through the bottom of the probe and the sensitivity of the apparatus is consequently improved. At the same time, since the bores do not extend through the probe, the enclosed elements are not subject to damage by the molten material.

In a preferred embodiment of this invention, the side

[1] Trademark of Norton Co.

walls of the probe are made of dense graphite such as National Carbon type CS-312 and the bottom of the probe comprises a fenestrated plug indicated in the drawing as 15 and formed of the same type of graphite.

The surface of the tubular section of the probe is preferably coated with Alundum cement to protect the graphite from atmospheric oxidation and possible slag attack. No coating is applied over the bottom of the end plug.

This particular embodiment of the invention provides long operational life and continued accuracy of measurements since the graphite bottom surface is substantially unaffected by molten steel and other molten metals.

In general, the size of the probe used in the present invention is not critical. However, a wall thickness of about 1 inch and a bottom thickness of about 2 inches is preferred in order to provide adequate protection for the enclosed components. When bores are provided in the bottom of the probe, these can extend to within about ⅛ inch of the outer surface.

The apparatus of the present invention can be enclosed at its upper portion in any convenient manner. In the event that cooling for the components within the probe is considered desirable, the probe can be appropriately sealed and provided with circulating cooling fluids which can, for example, be nitrogen or an inert gas.

In the practice of this invention, the use of helium as a cooling medium is preferred since with this material elements having atomic numbers from 14 and up can be measured, whereas with other cooling materials the elements which can be measured are further limited. For example, with air present in the probe, only elements from atomic number 22 can be practically measured.

Although the foregoing description has referred particularly to the analysis of molten steel, it is to be understood that other metals and alloys can be similarly analyzed by the practice of the present invention.

In a further embodiment of the present invention, the bores 13 can extend completely through the bottom of the probe as shown by the dotted line extensions when a sufficient pressure or flow of gas, e.g. helium, is provided in the probe to prevent the entry of molten metal into the probe. This embodiment provides increased sensitivtiy and range of operation.

The present invention is suitable for use in vacuum furnaces as well as those operated at normal atmospheric pressures.

The following example indicates the suitability of the probe of the present invention in environments such as encountered in steel making operations.

Example

A hollow graphite tube 75 inches long, having a 9 inch outside diameter and about an 8 inch inner diameter was provided with a ⅜ inch coating of clay bonded alumina cement (Alundum) for a distance of 2 ft. from its lower end. The lower end of the graphite tube was closed with a graphite plug about 1½ inches thick. The plug was not coated.

The tube was lowered into a furnace in which steel scrap was being melted. The bottom of the closed graphite tube, i.e. the plug, was lowered 6 inches into the molten steel bath and held in this position for 3 minutes after which the probe was withdrawn.

There was no visual evidence of attack on the sides of the probe or on the uncoated plug.

When the probe had cooled to room temperature, the refractory coating was removed and a residual metal coating on the bottom of the plug was easily peeled off without affecting the surface.

Commercially available equipment which can be used or modified for use in the present invention is disclosed in Norelco X-ray Analytical Instrumentation Catalogue RC 36-7.5-A-6/61.

What is claimed is:

1. An apparatus for analyzing molten material which comprises a hollow vertically extending body member having a graphite bottom portion, said body member adapted to have the graphite bottom portion thereof placed in contact with the molten material; a source of primary X-ray radiation located and centrally aligned within said body member and arranged and adapted to transmit X-ray radiation through the graphite bottom portion of said body member to develop secondary fluorescent radiation in said molten material; at least one detecting means located within said body member and being adapted to receive secondary fluorescent radiation which is developed in said molten material by said primary X-ray radiation and which passes through the graphite bottom portion of said body member, said graphite bottom portion of said body member having a first bore passing partially through said bottom member directly below the source of primary X-ray radiation to thereby facilitate the transmission of radiation to the molten material and said bottom portion having additional bores extending partially therethrough located to facilitate transmission of fluorescent radiation from the molten material to the detecting means, said detecting means also being adapted to transmit a signal having a predetermined relation to the intensity of received fluorescent radiation; collimating means arranged within said body member to permit said fluorescent radiation to be received by said detecting means while shielding said detecting means from the primary X-ray radiation; and means connected to said detecting means responsive to signals transmitted thereby for providing an indication of the intensity of the received fluorescent radiation.

2. An apparatus in accordance with claim 1 wherein the bores in the graphite bottom portion of said body member pass completely through said graphite bottom portion, pressurized gas being provided in the body member to prevent ingress or molten material into the body member through said bores.

3. Apparatus in accordance with claim 1 wherein the side walls of said body member are formed of carbon having a coating which is resistant to attack from the molten material to be analyzed.

4. Apparatus in accordance with claim 1 wherein the side walls of said body member are formed of carbon having a coating of clay bonded alumina.

References Cited by the Examiner

UNITED STATES PATENTS

| | | | |
|---|---|---|---|
| 2,133,776 | 10/1938 | Bender | 250—83.6 |
| 2,318,667 | 5/1943 | Bruce | 250—51.5 X |
| 2,465,322 | 3/1949 | Considine | 73—355 |
| 2,943,202 | 6/1960 | Kramer | 250—43.5 |
| 3,012,140 | 12/1961 | Pellissier et al. | 250—83.3 |
| 3,100,261 | 8/1963 | Bigelow | 250—51.5 |
| 3,100,814 | 8/1963 | Reider | 250—83.3 |

RALPH G. NILSON, *Primary Examiner.*

H. S. MILLER, G. E. MATTHEWS, W. F. LINDQUIST, *Assistant Examiners.*